United States Patent
Kern et al.

(10) Patent No.: US 8,356,771 B2
(45) Date of Patent: Jan. 22, 2013

(54) COUPLING FOR JOINING TWO FRAME SEGMENTS

(75) Inventors: Barbara Kern, Bremen (DE); Hermann Benthien, Sottrum (DE)

(73) Assignee: Airbus Operations GmbH, Hamburg (DE)

( * ) Notice: Subject to any disclaimer, the term of this patent is extended or adjusted under 35 U.S.C. 154(b) by 454 days.

(21) Appl. No.: 12/499,147

(22) Filed: Jul. 8, 2009

(65) Prior Publication Data

US 2010/0012783 A1    Jan. 21, 2010

Related U.S. Application Data

(60) Provisional application No. 61/135,497, filed on Jul. 21, 2008.

(51) Int. Cl.
*B64C 1/06* (2006.01)

(52) U.S. Cl. .......................................... 244/131; 244/119

(58) Field of Classification Search .............. 244/117 R, 244/119, 123.1, 131, 124, 129.1; 403/331
See application file for complete search history.

(56) References Cited

U.S. PATENT DOCUMENTS

| | | | | |
|---|---|---|---|---|
| 5,412,913 A | * | 5/1995 | Daniels et al. | 52/79.13 |
| 6,105,902 A | | 8/2000 | Pettit | |
| 2006/0144006 A1 | * | 7/2006 | Suzuki et al. | 52/655.1 |

FOREIGN PATENT DOCUMENTS

| | | |
|---|---|---|
| FR | 687024 A | 4/1930 |
| WO | WO 2006/100400 | 9/2006 |
| WO | WO 2008135533 A1 * | 11/2008 |

OTHER PUBLICATIONS

German Office Action from DE 10 2008 040 577.9 dated Jan. 20, 2011 (English translation).

* cited by examiner

*Primary Examiner* — Tien Dinh
*Assistant Examiner* — Nicholas McFall
(74) *Attorney, Agent, or Firm* — Jenkins, Wilson, Taylor & Hunt, P.A.

(57) ABSTRACT

The invention relates to a coupling for joining two frame segments within a fuselage cabin structure of an aircraft. The frame segments may comprise a Z-shaped or I-shaped cross-sectional geometry, optionally including a recess. Towards the top and the bottom, respectively, the frame segments are equipped with a header flange and a footer flange. According to the invention, at least one side plate is arranged in the area of one side of the web, and at least one counter plate is fitted in the area of an opposing side of the web. Because of the side plates and counter plates butted and riveted symmetrically on both sides against the webs of the frame segments to be joined, the coupling is moment-free and can be configured in a weight-optimized way. For further increase of rigidity, the header flanges may additionally be riveted with the side plates and/or counter plates.

12 Claims, 3 Drawing Sheets

COUPLING FOR JOINING TWO FRAME SEGMENTS

CROSS-REFERENCE TO RELATED APPLICATIONS

This application claims the benefit of U.S. Provisional Application No. 61/135,497, filed Jul. 21, 2008, the entire disclosure of which is herein incorporated by reference.

FIELD OF THE INVENTION

The invention relates to a coupling for joining two frame segments within a fuselage cabin structure of an aircraft, the frame segments comprising a vertical web connected with a header flange and a footer flange.

BACKGROUND OF THE INVENTION

Aircraft fuselage structures made from metal or, more recently, also from composite materials, are manufactured by joining several fuselage sections, thereby creating transverse seams, in order to simplify the production process. The fuselage sections themselves are formed from at least two shell segments, though more preferably from four shell segments, which are joined by creating at least two longitudinal seams on their periphery. The shell segments are formed from at least one piece of bent sheet metal, which on its inner side is riveted to several frame segments and further reinforcement profiles in such a manner as to support structural loads. The pieces of sheet metal serving as a covering for the frame segments constitute the future outer skin of the aircraft fuselage cabin.

The join of the shell segments has to meet a multitude of static requirements. On the one hand, the join should possess the same structural load bearing capacity as the shell segments at the same life expectancy, and, on the other hand, the join should not lead to an increase in overall weight. Further the join should exhibit the same error tolerance as the shell segments, and easy visual inspection during regular maintenance work should be possible.

In order to fulfill these requirements, conventional frame couplings to date are carried out as single shear butt joints. An advantage of this is that the joined components can be inspected visually from one side, but it also has the disadvantage that a greater number of connecting elements, in particular rivets, is necessary. Moreover, this uneven coupling technique presents the disadvantage that the inevitable geometric offset of the frame coupling and both frame segments entails undesirable offset moments, in particular about a y-axis. These additional moments are introduced into the fuselage cabin structure, and have to be taken into account statically by means of structural elements having larger dimensions, and, as a result, thus entail an increase in weight.

Therefore, it is an object of the present invention to provide a coupling of a new type for joining frame segments within a fuselage cabin structure of an aircraft, which allows moment-free linking of the arc-shaped frame segments to be joined.

This object is achieved by a frame coupling comprising the features set out in claim 1.

Due to at least one side plate being arranged in an area of one side of the web, and at least one counter plate being provided in at least a part of an area of an opposing side of the web, the frame coupling according to the invention exhibits a high degree of symmetry. Because of the connecting plates being provided symmetrically on both sides against the webs of the frame segment profiles, the generation of load-increasing moments in the region of the frame coupling is avoided. In the area of the header flanges of the frame segments, the coupling again is arranged in a single-shear configuration, so that in this area a defined weak point of the coupling is provided, and so that additionally, it is ensured that any secondary damages, such as corrosion and/or signs of fatigue, for example, can be discovered with certainty while the effort necessary for inspection remains unchanged.

In an advantageous embodiment of the coupling, both frame segments are connected through a butt joint, with a frame gap being created thereby.

Thereby, in the process of joining both frame segments by means of the coupling, compensation of tolerances is possible in a simple manner.

According to another advantageous embodiment, the at least one side plate, both frame segments, and the at least one counter plate are connected by means of a multitude of connecting elements, in particular by means of several arrangements of rivets formed by the rivets being disposed in a matrix-like manner.

Owing to the use of conventional rivets as connecting elements, jointing technology widely used in aircraft construction can be made further use of without modifications. Furthermore, the matrix-like arrangement of the connecting elements allows to transmit high forces and moments.

In still another advantageous embodiment, at least one side plate comprises an L-shaped cross-sectional geometry. In this way, the static load-bearing capacity of the coupling is improved.

In still another advantageous embodiment of the frame coupling, the at least one side plate is connected, in particular riveted, to the header flange of the web. This allows to further increase the load-bearing capacity of the frame coupling according to the invention.

Further advantageous embodiments of the coupling are set out in the claims.

BRIEF DESCRIPTION OF THE DRAWINGS

The accompanying figures show.

In the figures, like reference numbers denote like structural elements.

DETAILED DESCRIPTION OF THE INVENTION

Figure 1:
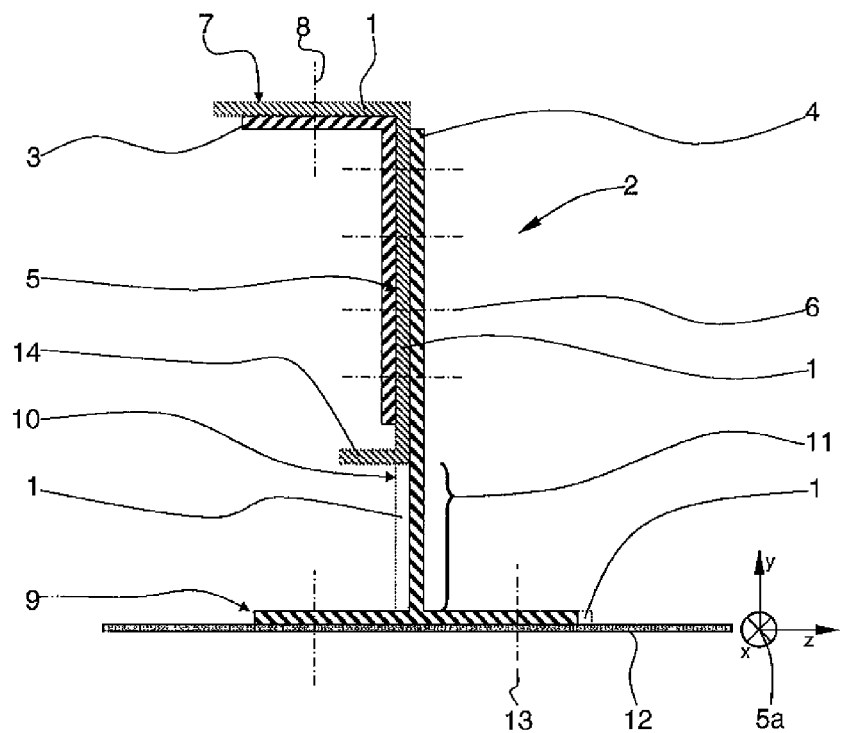
FIG. 1 a simplified sectional view of a Z-shaped frame segment comprising a recess in the web and a coupling, FIG. 2 a simplified sectional view of an I-shaped frame segment comprising a recess in the web and a coupling, FIG. 3 a simplified sectional view of an I-shaped frame segment without recess in the web, FIG. 4 a top view onto FIG. 3, and FIG. 5 a simplified sectional view of a coupling being in part arranged in a single-shear configuration.

FIG. 1 illustrates in a sectional view, and by way of example, the use of the coupling according to the invention on a frame segment comprising a Z-shaped cross-sectional geometry.

A coupling 2 is provided on a frame segment 1. The coupling 2 comprises a side plate 3 and a counter plate 4, which butt on both sides against a web 5 of the frame segment 1. In the embodiment according to FIG. 1, the counter plate 4 is provided with an inversely T-shaped cross-sectional geometry, while the side plate 3 is provided with an L-shaped cross-sectional geometry. A coordinate system 5a illustrates the spatial orientation of all components.

The side plate 3, the vertical web 5 of the frame segment 1 as well as the counter plate 4 are connected to each other by means of a multitude of rivets (a so-called arrangement of rivets or a rivet matrix), one rivet 6 of which is provided with a reference number, representative for all others. A header flange 7 of the frame segment 1, bent by 90° to the left with respect to the horizontal direction, is additionally firmly connected to the side plate 3 by means of a multitude of rivets, one rivet 8 of which is provided with a reference number. Furthermore, the frame segment 1 comprises a footer flange 9, which extends from the web 5 in the horizontal direction but is oriented opposite to the direction of the header flange 7.

The frame segment 1 further comprises a recess 10, which is provided in a lower region 11 of the web 5. One purpose of the recess 10 is that other reinforcement profiles, which run in a direction transverse to the frame segment 1 or in the direction of flight, respectively, and which are not displayed in FIG. 1, can pass through this recess. The footer flange 9 is connected to an outer fuselage skin 12 of a fuselage cabin structure of an aircraft, which is not displayed in the figure, by means of a multitude of rivets, only one rivet 13 of which is provided with a reference number in a representative way. For further reinforcement of the frame segment 1, frame segment 1 is provided with a reinforcement flange 14 extending in the direction of the header flange 7 above the recess 10.

Due to the side plate 3 and counter plate 4 butted on both sides against the web 5, the frame coupling 2 according to the invention is moment-free with respect to the y-axis of the local (component) coordinate system 5a and therefore can be configured statically in a lighter and more weight-saving manner in comparison to conventional frame couplings. The local coordinate system 5a or component coordinate system does not depend upon the aircraft coordinate system and relates only to one component under consideration at a time within the fuselage cabin structure, in this case, the frame coupling 2.

Figure 2:
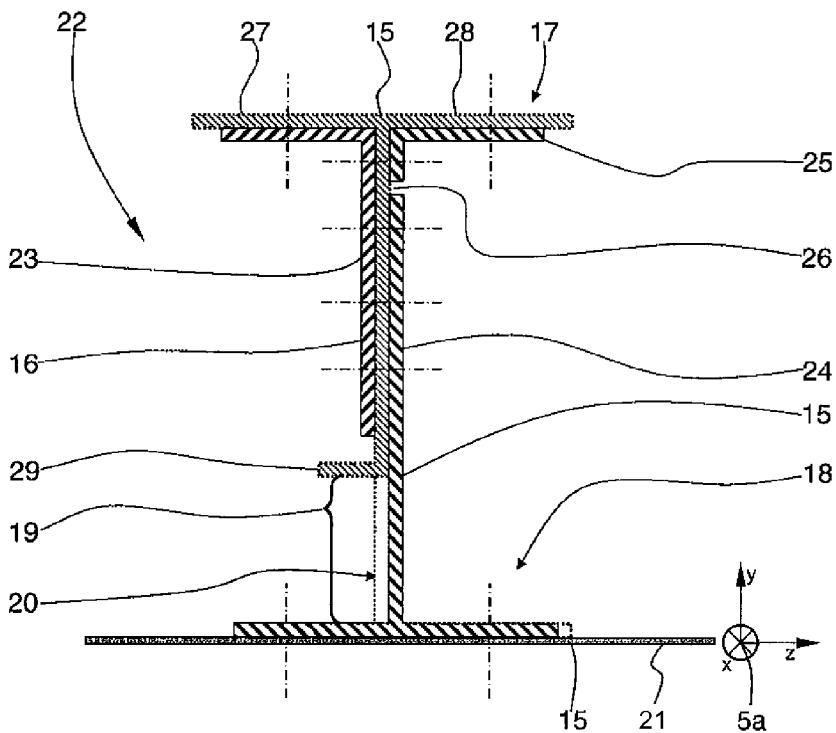
Figure 3:
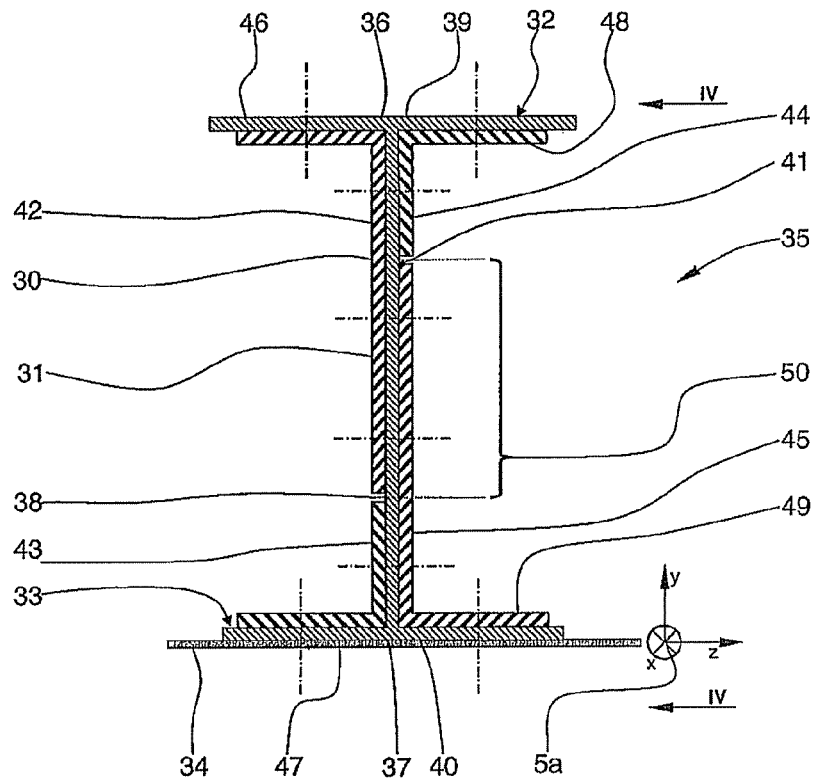
Figure 4:
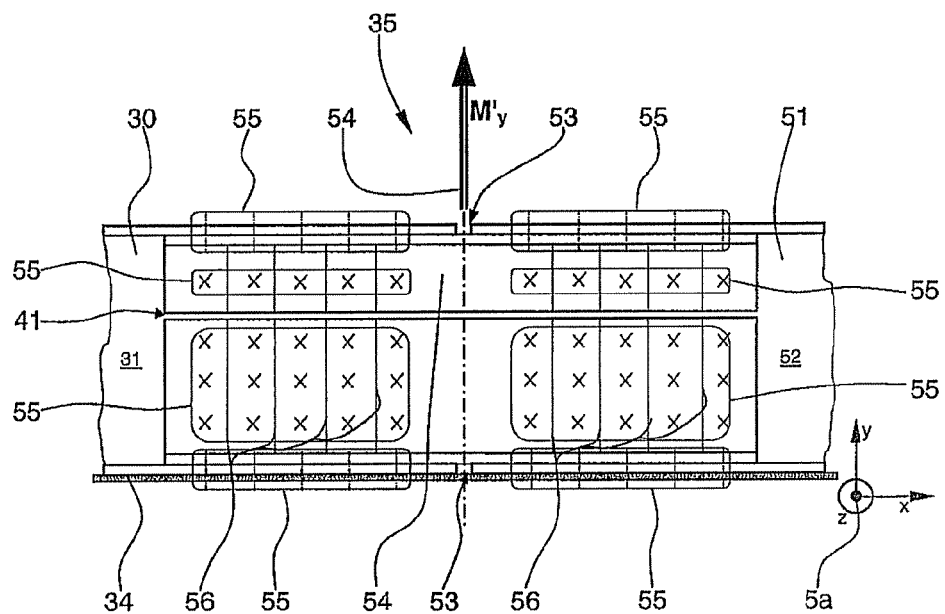

In order to improve the clarity of the drawings, the rivets or the required riveted connections are depicted in FIG. 2 to 4 using dash-dotted lines or small crosses, respectively, depending on the spatial orientation, and thus are not provided with separate reference signs.

FIG. 2 illustrates, by way of example, the use of the coupling according to the invention on a frame segment comprising an I-shaped cross-sectional geometry.

A frame segment 15 comprises a vertical web 16, the upper portion of which ends in a header flange 17, and the lower portion of which ends in a footer flange 18. The header flange 17 as well as the footer flange 18 extend symmetrically on both sides of the vertically extending web in the horizontal direction. A width of the header flange 17 may differ from a width of the footer flange 18. Further, a recess 20 is provided in a lower portion 19 of the frame segment 15, as well as in the region of the footer flange 18 of the frame segment 15. The footer flange 18 abuts on the outer fuselage skin 21 and is connected to it by means of a multitude of rivets.

A coupling 22 of this embodiment comprises as coupling elements a side plate 23 comprising an L-shaped cross-sectional geometry, a counter plate 24 which exhibits a T-shaped cross-sectional geometry, as well as a further counter plate 25, however exhibiting an L-shaped cross-sectional geometry. In between both counter plates 24, 25, a plate gap 26 exists, which also serves to compensate for manufacturing tolerances associated with the coupling elements and/or the frame segments. The side plate 23, both counter plates 24, 25 and the web 16 of the frame segment 15 are connected to each other by means of a multitude of rivets. Moreover, two arms 27, 28 of the L-shaped side plate 23 and the L-shaped counter plate 25 are additionally each riveted to the header flange 17. According to the construction of the frame segment 1 as shown in FIG. 1, the frame segment 15 of FIG. 2 also is provided with a reinforcement flange 29, which extends above the recess 20 in the horizontal direction to the left, starting from the recess 20. Compared to the header flange 17 and to the footer flange 18, the width of the reinforcement flange is smaller. This also applies to the construction of the frame segment 1 in FIG. 1.

Because of the coupling elements in the form of the side plate 23 and both counter plates 24, 25, butted on both sides against the frame segment 15, the coupling 22 exhibits a high degree of symmetry and is thus free of offset moments.

FIG. 3 shows the use of the coupling according to the invention for the joining of two frame segments comprising an I-shaped cross-sectional geometry but no recess in the frame profile.

A frame segment 30 comprises a vertical web 31, which on both ends is provided with a header flange 32 extending horizontally and with a footer flange 33 extending in parallel to the header flange. The header flange 32 as well as the footer flange 33 extend in the horizontal direction symmetrically on both sides of the vertically extending web 31. The footer flange 33 extends on an outer fuselage skin 34. A coupling 35 according to this embodiment is formed with two side plates 36, 37, which each exhibit a substantially L-shaped cross-sectional geometry and abut on the left side on the web 31, thereby forming a plate gap 38, as well as on the header flange 32 and on the footer flange 33 of the frame segment 30. Contrary to the other embodiments as described above, in this case two counter plates 39, 40 are provided, which likewise exhibit an approximately L-shaped cross-sectional geometry and abut on the right side on the web 31, thereby forming a plate gap 41, as well as on the header and footer flanges 32,33 of the frame segment 30.

In order to manufacture the coupling 35, vertical arms 42, 43 of the side plates 36, 37 and vertical arms 44, 45 of the corresponding opposing counter plates 39, 40 and the web 31 are joined to each other by means of a multitude of rivets. In order to further increase the mechanical load-bearing capacity of the coupling 35, additionally two horizontal arms 46, 47 of the side plates 36, 37 and two horizontal arms 48, 49 of the counter plates 39, 40 are riveted to the header flange 32 and to the footer flange 33 of the frame segment 30. There exists a vertical offset 50 of both plate gaps 38, 41, in order to avoid a weakening of the coupling 35 due to a continuous gap. Because of its high degree of symmetry, the embodiment of the coupling 35 as shown in FIG. 3 also is moment-free.

FIG. 4 shows a top view onto the coupling 35 which is shown in FIG. 3. The frame segment 30 comprising the web 31 is connected to a second frame segment 51 comprising a web 52 by means of the coupling 35 through a butt joint, a frame gap 53 for the compensation of tolerances being created therebetween. The local (component) coordinate system 5a illustrates again the position of all components in space. All rivet connections formed in parallel to the y-axis are indicated by a dash-dotted line, while rivets positioned in the direction of the z-axis are represented by crosses. In order to create the proper coupling 35, by means of the counter plates 39, 40 and the hidden side plates 36, 37 (see FIG. 3) the left frame segment 30, the right frame segment 51 and the outer fuselage skin 34 are each entirely joined using rivets, with a total of eight matrix-like arrangements of rivets 55, all of these being provided with the same reference sign, thereby being formed.

In order to further reduce the weight of the coupling 35, a material thickness of the counter plates 39, 40 diminishes on both sides of the frame gap 53 in a multitude of steps 56, so that the material thickness of the counter plates 39, 40 and the side plates 36, 37, the latter being hidden in this view, is greatest in the region of the frame gap 53 and is being reduced outwardly, in other words, along the circumferential direction of the frame segments 30, 51, to a minimal value in a symmetric manner with respect to the frame gap 53. Due to the symmetric construction, a moment 54 (offset moment $M_y'$) is absent.

A mutual offset of rivets within the arrangements of rivets 55 or the rivet matrices, respectively, preferably corresponds to four times the diameter of the bore holes, and an offset of the rivets from the edge preferably amounts to two times the diameter of the bore holes. The material thickness of the side plates and the counter plates taken together may correspond, for example, to 1.2 times a material thickness of the frame.

Furthermore, all couplings within the fuselage cabin structure are positioned with an offset with respect to the longitudinal seams present in the fuselage structure and in joints of the metal sheets forming the outer fuselage skin, respectively.

Figure 5:
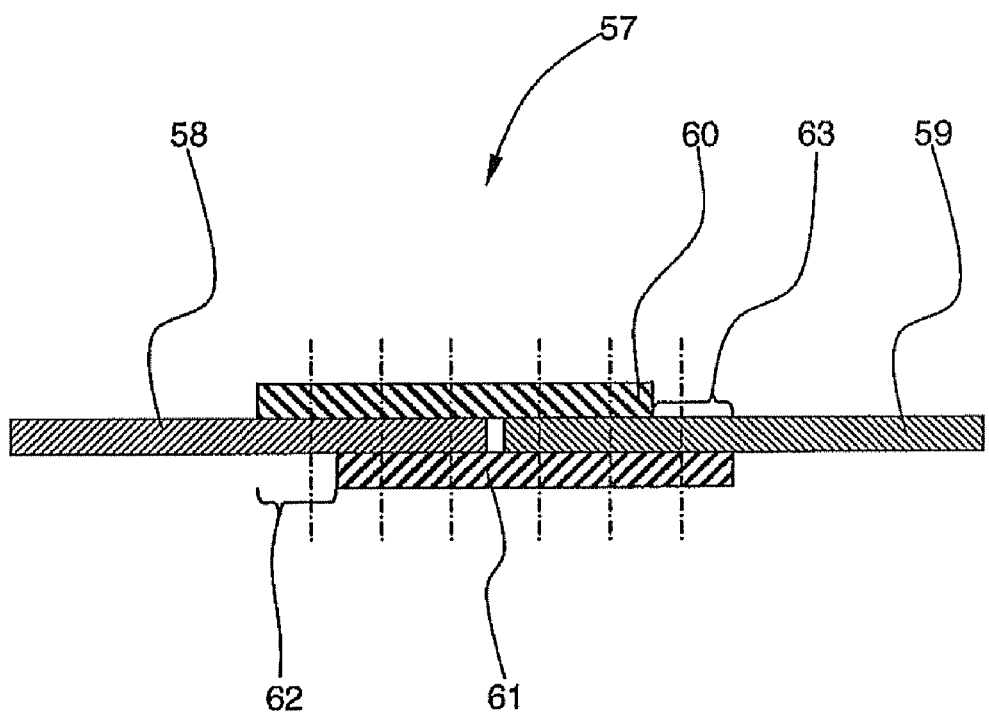

FIG. 5 displays an alternative coupling, which is in part arranged in only a single-shear configuration and is used only under exceptional circumstances.

By means of a coupling 57, both frame segments 58, 59 are connected through a butt joint. The coupling 57 comprises two plates 60, 61 butted on both sides against the frame segments 58, 59, the connection between the frame segments 58, 59 and both plates 60, 61 being accomplished using a multitude of connecting elements, in particular rivets, the rivets being represented in the view shown in FIG. 5 by a total of six dash-dotted lines. The coupling 57 differs from the frame couplings described beforehand especially in that two single-shear areas 62, 63 are present, in which the coupling 57 is constructed as only a single-layer arrangement. This means that the frame segments 58, 59 are not provided on both sides with the plates 60, 61. Because of the regions 62, 63 arranged as a single-shear configuration, a visual inspection and examination of the coupling 57 with regard to corrosion, signs of fatigue or the like, for example, is possible.

The exemplary frame segments described in FIGS. 1 to 5, which are used for reinforcement of fuselage cabin structures of aircraft and are joined by means of the coupling arrangement according to the invention, are preferably formed integrally from high-strength aluminum alloys such as, for example, the well-known alloy system 70 10 50 T 7451 oder the like. Manufacturing the frame segments is preferably accomplished from the solid material, for example by milling, spark eroding or the like.

In comparison to the single-shear solution, the frame couplings according to the invention are space-saving and, because of the symmetric construction, free from offset moments and offset forces, respectively.

What is claimed is:

1. An aircraft frame coupler for joining two frame segments within a fuselage cabin structure of an aircraft, the frame segments comprising a vertical web connected with a header flange and a footer flange, comprising:
   at least one side plate arranged in an area of one side of a vertical web of two frame segments within a fuselage cabin structure of an aircraft; and
   at least one counter plate arranged in at least a part of an area of an opposing side of the web, wherein the side plate and the counter plate are butted on both sides against the frame segments, and wherein the side plate and the counter plate are arranged to define two single-shear-areas in which the coupling is constructed as single-layer arrangement, wherein a first region is defined in which only one of the side plate or the counter plate is butted against the frame segments, and a second region is defined in which only the other of the side plate or the counter plate is butted against the frame segments.

2. Coupling according to claim 1, wherein both frame segments are connected through a butt joint, with a frame gap being created thereby.

3. Coupling according to claim 1, wherein the at least one side plate, both frame segments, and the at least one counter plate are connected by a multitude of connecting elements.

4. Coupling according to claim 1, wherein the at least one side plate comprises an L-shaped cross-sectional geometry.

5. Coupling according to claim 1, wherein the at least one side plate is connected to the header flange.

6. Coupling according to claim 1, wherein
   the at least one counter plate comprises a T-shaped or L-shaped cross-sectional geometry; and
   the frame segment comprises at least one recess provided in the web and in the footer flange; and
   the web comprises at least one reinforcement flange.

7. Coupling according to claim 6, wherein the at least one counter plate is connected to the footer flange.

8. Coupling according to claim 1, wherein two side plates as well as two counter plates are provided on both sides of the web, thereby creating two horizontally offset plate gaps.

9. Coupling according to claim 2, wherein a material thickness of the at least one side plate and/or a material thickness of the at least one counter plate diminishes in steps and/or continuously on both sides of the frame gap.

10. Coupling according to claim 1, wherein a plurality of couplings are positioned each with an offset with respect to longitudinal seams present in the fuselage cabin structure.

11. Coupling according to claim 5, wherein the at least one side plate is riveted to the header flange.

12. Coupling according to claim 7, wherein the at least one counter plate is riveted to the footer flange.

* * * * *